(12) United States Patent
Nicholas et al.

(10) Patent No.: US 9,593,722 B2
(45) Date of Patent: Mar. 14, 2017

(54) CV JOINT GASKET

(71) Applicant: Ford Global Technologies, LLC, Dearborn, MI (US)

(72) Inventors: Christopher Peter Nicholas, Milford, MI (US); Scott Wilson, Lexington, MI (US); David Michael Pariseau, Royal Oak, MI (US); Edward Lanivich, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/693,227

(22) Filed: Apr. 22, 2015

(65) Prior Publication Data

US 2016/0312837 A1   Oct. 27, 2016

(51) Int. Cl.
*F16D 1/076* (2006.01)
*F16D 3/84* (2006.01)
*F16D 3/20* (2006.01)

(52) U.S. Cl.
CPC ........ *F16D 3/84* (2013.01); *F16D 3/20* (2013.01)

(58) Field of Classification Search
CPC ..................................... F16D 3/20; F16D 3/84
USPC ......... 464/182, 904–906; 277/312–314, 626, 277/628, 630; 403/34, 38, 288; 411/929
See application file for complete search history.

(56) References Cited

U.S. PATENT DOCUMENTS

| | | | |
|---|---|---|---|
| 3,573,870 A * | 4/1971 | Gastineau | F16L 23/20 |
| 6,237,920 B1 | 5/2001 | Nicolai et al. | |
| 6,663,494 B2 | 12/2003 | Curi | |
| 7,029,399 B2 | 4/2006 | Oki et al. | |
| 7,040,992 B2 | 5/2006 | Dine et al. | |
| 8,297,625 B2 * | 10/2012 | Schmid | F16D 3/223 464/906 |
| 2008/0038084 A1 * | 2/2008 | Nakamura | F16B 33/004 277/312 X |

FOREIGN PATENT DOCUMENTS

| | | |
|---|---|---|
| CN | 202545613 U | 11/2012 |
| JP | 2007010029 A | 1/2007 |
| JP | 2008038928 A | 2/2008 |

\* cited by examiner

*Primary Examiner* — Gregory Binda
(74) *Attorney, Agent, or Firm* — James Dottavio; Brooks Kushman P.C.

(57) ABSTRACT

A constant velocity joint includes a body, a cup, an annular array of bolts, and an annular gasket. The body has a first planar surface. The cup has a second planar surface positioned adjacent the first planar surface. The annular array of bolts interconnects the cup and body. The annular gasket is interposed between the planar surfaces of the cup and the body. The gasket has a plurality of notches defined on an outer perimeter of the gasket sized to receive the array of bolts. The notches are spaced adjacent to a corresponding bolt and define an open space between the planar surfaces around a bolt periphery. The open space enables thread-locking fluid to escape without causing displacement of the gasket or separation of the planar surfaces. A method of transmitting torque through a CV joint is also contemplated.

7 Claims, 2 Drawing Sheets

CV JOINT GASKET

TECHNICAL FIELD

The present disclosure relates to constant velocity joints for vehicles.

BACKGROUND

Constant velocity joints (hereinafter "CV joints") allow a driveshaft to transmit torque between two elements at a variable angle and constant rotational speed. CV joints may be used at shaft interfaces and transfer torque from the driveshaft to an axle. CV joints are beneficial because angles between shaft interfaces change frequently. Typically, CV joints use a spherical inner shell having six grooves wherein each groove guides a single spherical ball. This allows the CV joint to have the necessary range of motion to account for the changing angles between shaft interfaces.

SUMMARY

A constant velocity joint includes a body, a cup, an annular array of bolts, and an annular gasket. The body has a first planar surface. The cup has a second planar surface positioned adjacent the first planar surface. The annular array of bolts interconnects the cup and body. The annular gasket is interposed between the planar surfaces of the cup and the body. The gasket has a plurality of notches defined on an outer perimeter of the gasket sized to receive the array of bolts. The notches are spaced adjacent to a corresponding bolt and define an open space between the planar surfaces around a bolt periphery. The open space enables thread-locking fluid to escape without causing displacement of the gasket or separation of the planar surfaces.

A transmission includes a first shaft, a second shaft, a CV joint, and a gasket. The CV joint interconnects the first and second shafts. The CV joint has a cup and a body connected with an array of bolts wherein the first shaft splines to the body and the second shaft splines to the cup. The gasket is interposed between the cup and body and has an array of notches sized to receive the bolts defined on a gasket outer perimeter. The notches define an open space between the cup and body enabling thread-locking fluid to escape and maintain a planar engagement between a first planar surface of the cup and a second planar surface of the body.

A torque transmission method includes interconnecting a body and a cup of a CV joint with a bolt array. The torque transmission method further includes interposing a gasket between the cup and body defining a notch array around an outer perimeter corresponding to the bolt array, the notch array defining a gap adjacent a corresponding bolt, the gap configured to enable thread-locking fluid to escape between the cup and body to maintain flush cup and body engagement.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
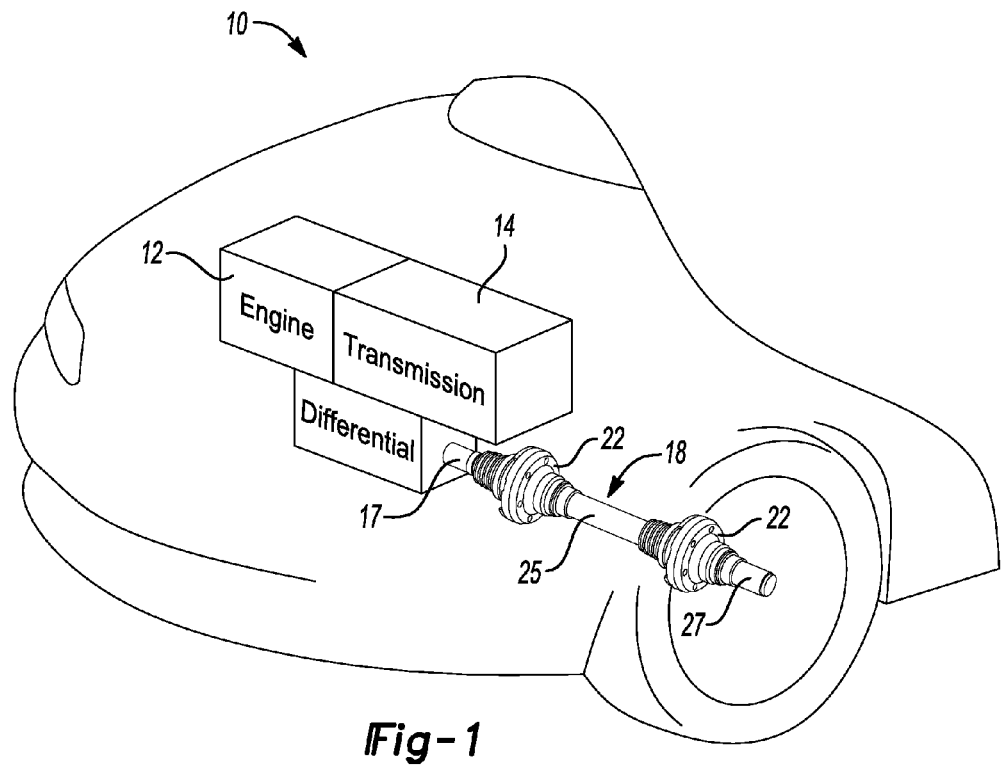
FIG. 1 depicts a partial schematic view of a vehicle.

FIG. 1 depicts a partial schematic view of vehicle 10. The vehicle 10 includes an engine 12, a transmission 14, a differential 16, and a front axle assembly 18. The engine 12 uses combustion to produce torque. The transmission 14 transfers torque, from the engine 12, through the differential 16 to the axle assembly 18. The axle assembly 18 includes an input shaft 17, a first shaft 25, and a second shaft 27. Torque is output from the differential 16 to the input shaft 17 of the axle assembly 18. The input shaft 17, the first shaft 25, and the second shaft 27 are mechanically connected to wheel 20 through CV joints 22. CV joints 22 are typically used between the input shaft 17 and the first shaft 25, as well as between the first shaft 25 and the second shaft 27 to allow torque output from the differential 16 to reach wheel 20.

The CV joints 22 account for variable angular displacement between the shaft interfaces to maintain a constant rotational speed during vehicle travel. The variable angular displacements may occur during normal suspension motion, such as during vehicle cornering or other road disturbances, for example potholes. The CV joint 22 maintains torque integrity of the vehicle 10 by allowing the first shaft 25 and the second shaft 27 of the axle assembly 18 to rotate at the same rate throughout the range of normal suspension motion. A slight angular offset between the CV joint components may distort the rotational rate between the first shaft 25 and the second shaft 27 of the axle assembly 18. The distortion of the rotational rate may be felt throughout the vehicle 10 as noise, vibration, or harshness.

Figure 2:
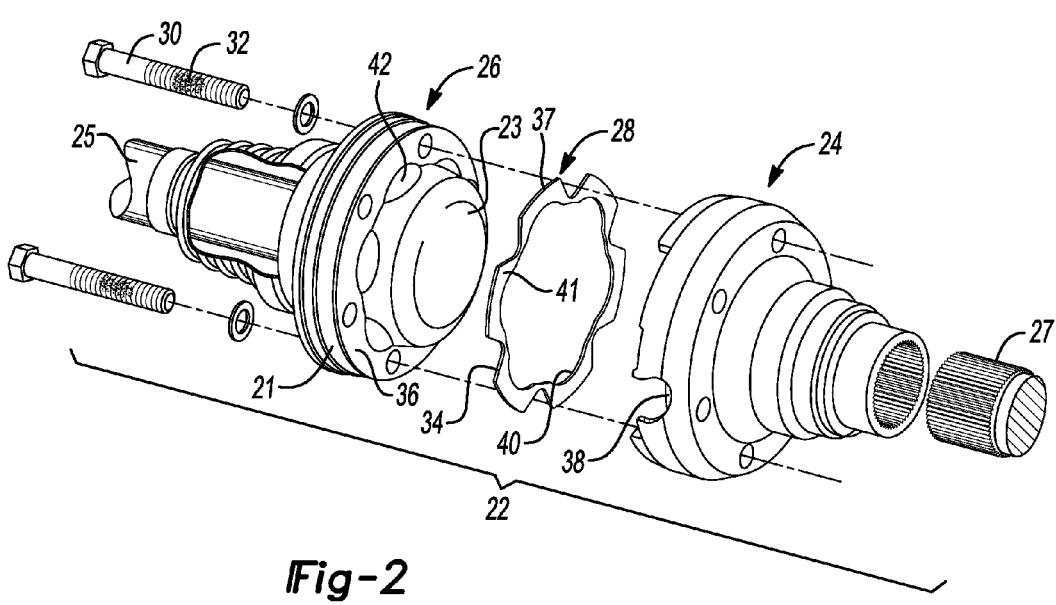
FIG. 2 depicts an exploded perspective view of a CV joint.

FIG. 2 depicts an exploded perspective view of the CV joint 22. The CV joint 22 includes a cup 24, a body 26, and a gasket 28 interposed between the cup 24 and the body 26. A first shaft 25 splines into the body 26 and a second shaft 27 splines into the cup 24. The first shaft 25 splines into a gear (not shown) within the body 26. The body 26 of the CV joint 22 also includes a plurality of helical grooves (not shown). A plurality of bearings (not shown) fit within the helical grooves. The bearings are disposed around the gear allowing for rotation of the gear within the body 26. The rotation of the bearings is defined by the shape of the grooves in the body 26. The body 26 also includes a cage (not shown) that retains the bearings and the gear within the body 26. The CV joint may also include a cap 23. The cap 23 is pressed onto a first end 21 of the body 26 and covers the grooves, the bearings, the gear, and the cage when the body 26 is engaged with the cup 24. The cap 23 prevents debris from interfering with the bearings, the grooves, the gear, or the cage and increases durability of the CV joint 22.

The cup 24 and the body 26 each have generally coplanar mating flanges that are mechanically fastened together. An array of bolts 30 may be used as mechanical fasteners to connect the body 26 to the cup 24. A thread locking fluid 32 is typically placed on the array of bolts 30 during assembly of the CV joint 22. The thread locking fluid 32 ensures the array of bolts 30 lock the body 26 to the cup 24 and provide a rigid connection to transfer torque through the CV joint 22. The rigid connection allows the rotational speed of the first shaft 25 to transfer to the second shaft 27 such that the first and second shafts 25, 27 rotate at a constant speed.

The gasket 28 includes a plurality of notches 34 defined on an outer perimeter 37 of the gasket 28. The plurality of notches 34 correspond with the array of bolts 30. The plurality of notches 34 may also be defined in an array defined adjacent the array of bolts 30 to allow clearance for the bolts to connect the body 26 to the cup 24. The gasket 28 is interposed between the cup 24 and the body 26 separating a first planar surface 36 of the body 26 and a second planar surface 38 of the cup 24. The first planar surface 36 of the body 26 may be defined on the cap 23. In at least one embodiment, the gasket 28 may be a metallic or semi metallic material. The gasket 28 may also be formed of other materials, such as but not limited to, elastomeric, ceramic, or plastic materials.

The gasket 28 may further include a plurality of tabs 41 defining a plurality of locating portions 40. The tabs 41 of the gasket 28 are formed between the plurality of notches 34 to allow the array of bolts 30 to connect the cup 24 and the body 26. The locating portions 40 may also be disposed in an array wherein the array of locating portions 40 are disposed between each bolt of the array of bolts 30. The locating portions 40 correspond to a plurality of ridges 42 disposed on the cap 23. The plurality of ridges 42 is typically a plurality of raised protrusions defined on the cap 23 to allow for movement of the bearings within the grooves.

The locating portions 40 locate the gasket 28 between the cup 24 and the body 26. The locating portions 40 prevent the gasket 28 from shifting or rotating positions between the cup 24 and the body 26 by fitting around the plurality of ridges 42. Preventing movement of the gasket 28 between the cup 24 and the body 26 aids to prevent angular displacement of the cup 24 and the body 26. The locating portions 40 aid the gasket 28 in maintaining a flush coplanar engagement between the cup 24 and the body 26. A flush coplanar engagement between the cup and body 24, 26 of the CV joint 22 aids to ensure a constant rotational speed between the cup 24 and the body 26. Maintaining a constant rotational speed at a variable angular offset of the first and second shafts 25,27 allows the CV joint 22 to maintain the torque integrity of the vehicle 10. The gasket 28 may also be located between the cup 24 and the body 26 using an adhesive to prevent the gasket 28 from shifting or rotating positions between the cup 24 and the body 26.

Figure 3:
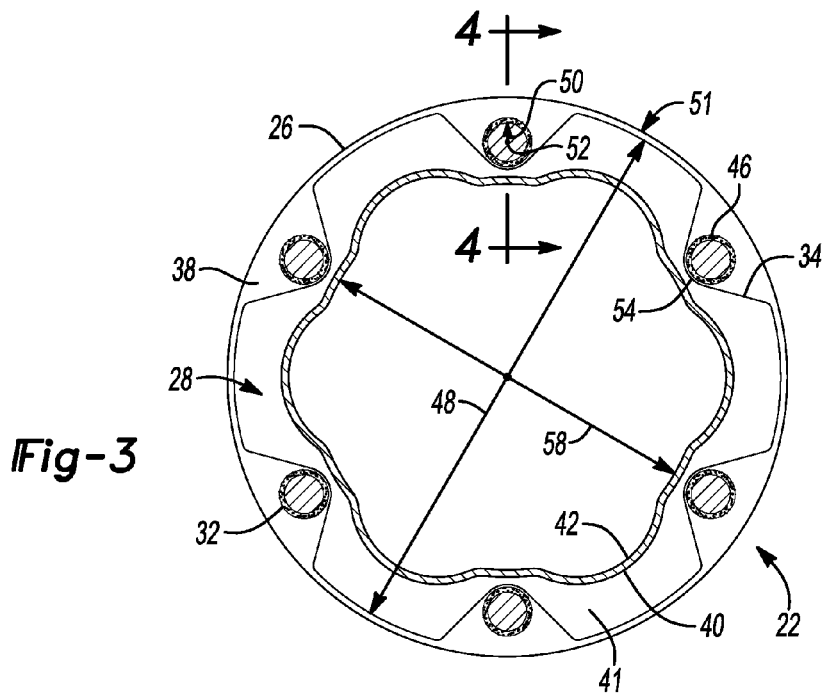
FIG. 3 depicts a front axial cross-sectional view of a CV joint body with a gasket.

FIG. 3 depicts a front view of the gasket 28 located on the first planar surface 36 of the body 26. The gasket 28 has an outer radial diameter 48 greater than a radius 50 of a bolt centerline 52. The plurality of notches 34 may also include an indentation 54. The indentations 54 are defined for about 90° of a bolt periphery 46. The plurality of notches 34 may then extend tangent from the indentations 54 to the outer radial diameter 48 of the gasket 28. Extending tangent from the indentations 54 allows the notches 34 to widen area around the bolt periphery 46. The outer radial diameter 48 of the gasket may extend to an outer radial diameter 51 of the first planar surface 36. The outer radial diameter 48 of the gasket 28 may be substantially equal to the outer radial diameter 51 of the first planer surface 36 to aid in locating the gasket 28.

The plurality of tabs 41 extend to the outer radial diameter 48 of the gasket. The locating portions 40 defined on the plurality of tabs 41 are semi-annular and disposed in an array between the notches 34. The locating portions 40 are formed from an inner radial diameter 58 and extend in the direction of the outer radial diameter 48 of the gasket 28. The semi-annular arch of the locating portions 40 complement the plurality of ridges 42 defined on the body 26 of the gasket 28. As described above, the plurality of ridges 42 defined on the body 26 to account for the variable angles the CV joint 22 accommodates. Therefore, depending on the size of the CV joint 22, the size of the plurality of locating portions 40 may change to accommodate the increased size of the plurality of ridges 42

Locating the tabs 41 adjacent the plurality of notches 34 and forming the outer radial diameter 48 substantially equal to the outer radial diameter 51 of the first planar surface 36 aids to increase stiffness and rigidity of the gasket 28. The increased stiffness and rigidity of the gasket 28 aids in preventing deformation of the gasket 28 within the CV joint 22. Preventing deformation to gasket 28 aids to ensure that there is no angular offset between the cup 24 and the body 26 within the CV joint 22. Forming the locating portions 40 proximate the plurality of notches 34 aids to ensure the first and second planar surfaces 36, 38 maintain a parallel, planar orientation within the CV joint 22.

Figure 4:
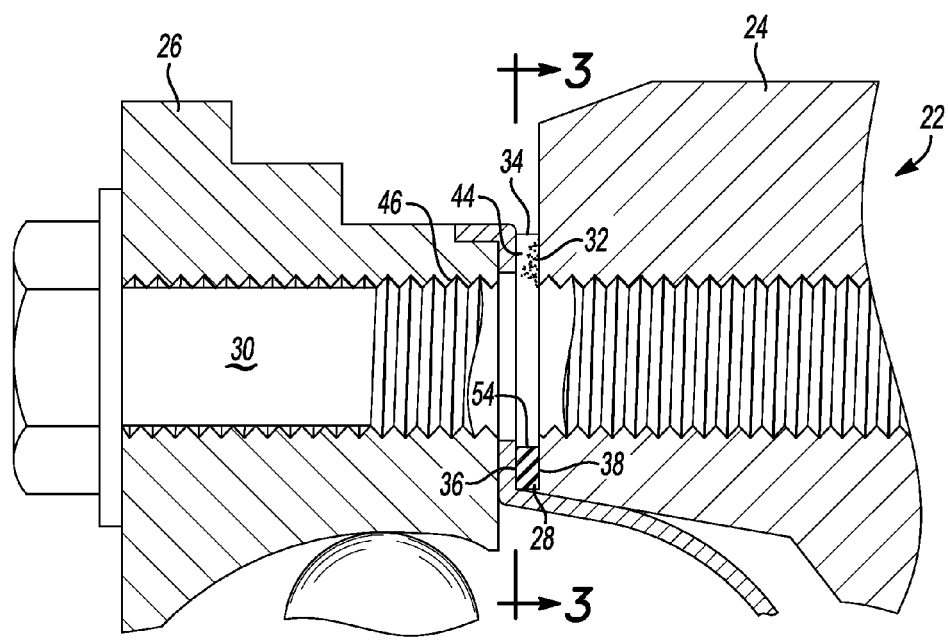
FIG. 4 depicts a partial longitudinal cross-sectional view of a gasket for a CV joint.

FIG. 4 depicts a partial cross-sectional view of the gasket 28 located between the cup 24 and body 26 taken along lines 4-4 in FIG. 3. The gasket 28 is shown interposed between the first planar surface 36 of the body 26 and the second planar surface 38 of the cup 24. The interposition between the first planar surface 36 and the second planar surface 38 allows the gasket 28, through the plurality of notches 34, to create a gap between the body 26 and the cup 24. Specifically, the plurality of notches 34, through the indentations 54, defines an open space 44 between the first planar surface 36 and the second planar surface 38. The open space 44 is defined around a bolt periphery 46 to the indentations 54. As stated above, the plurality of notches 34 may also be defined in an array defined adjacent the array of bolts. Similarly, the open space 44 may define a plurality of open spaces 44 arranged in an array corresponding to the array of notches 34. Increasing space around the bolt periphery 46 creates space within the CV joint 22 that may be used prevent angular offset between the cup 24 and the body 26.

For example, the thread locking fluid 32 may leak, or escape off of the bolts 30. When the thread locking fluid 32 leaks between the cup 24 and the body 26, it may unseat the cup 24 and body 26 such that the body 26 is seated at an angle with respect to the cup 24. Angular offset within the CV joint 22 occurs when the body 26 is cocked at an angle with respect to the cup 24. Angular offset between the cup 24 and the body 26 may cause excessive noise, vibration, and harshness felt through the CV joint 22. The widened area around the bolt periphery 46 may compensate for debris, such as the thread locking fluid 32, within the CV joint 22.

Creating open space 44 and enabling the thread locking fluid 32 to escape into the open space 44 maintains a flush and generally coplanar disposition between the first planar surface 36 and the second planar surface 38. Open space 44 allows the thread locking fluid 32 to escape without causing separation of the parallel orientation of the first planar surface 36 and the second planar surface 38 as well as displacement of the gasket 28. The flush disposition of the first 36 and second 38 planar surfaces eliminates noise, vibration, and harshness that may be caused by escaping thread locking fluid. Open space 44 allows the thread locking fluid 32 an area to gather without separating the parallel, planar orientation of the cup 24 and the body 26.

The parallel, planar orientation of the cup 24 and the body 26 enables the CV joint 22 to rotate at a constant speed. When the CV joint 22 rotates at a constant speed, the torque transfer through the CV joint 22 is uniform. Uniform torque transfer through the CV joint 22 provides more efficient torque transfer and reduces noise, vibration, and harshness caused by distortion within the CV joint 22.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A constant velocity joint comprising:
   a body having a first planar surface;
   a cup having a second planar surface positioned adjacent the first planar surface;
   an annular array of bolts interconnecting the cup and body; and
   an annular gasket interposed between the planar surfaces of the cup and the body using a plurality of tabs defining locating portions disposed in an array between the bolts, the gasket having an outer radial diameter substantially equal to an outer radial diameter of the first planar surface and greater than a radius of a bolt centerline and a plurality of notches defined on an outer perimeter of the gasket sized to receive the array of bolts, each of the notches being spaced adjacent to a corresponding bolt and defining an open space between the planar surfaces around a bolt periphery to an indentation on the gasket extending tangent from each of the notches.

2. The constant velocity joint of claim 1, wherein the indentation is defined for about 90 degrees of the bolt periphery.

3. The constant velocity joint of claim 1, wherein the plurality of tabs extend to the outer radial diameter of the gasket.

4. The constant velocity joint of claim 1, wherein the gasket prevents contact between the body and the cup at the first and second planar surfaces.

5. A transmission comprising:
   a first shaft;
   a second shaft;
   a CV joint interconnecting the first and second shafts having a cup and a body connected with an array of bolts wherein the first shaft splines to the body and the second shaft splines to the cup; and
   a gasket interposed between the cup and body, the gasket having an outer radial diameter, which is greater than a radius of a bolt centerline and an array of notches sized to receive the bolts defined on a gasket outer perimeter, the notches defining an open space between the cup and body, wherein the open space is defined adjacent a bolt centerline between the gasket outer perimeter and an indentation defined in the notches and wherein the gasket further includes an array of tabs disposed between the notches, the tabs defining a plurality of semi-annular cutouts configured to locate the gasket between the first and second planar surfaces.

6. The transmission of claim 5, wherein the open space defines a plurality of open spaces arranged in an array corresponding to the array of notches.

7. A torque transmission method comprising:
   interconnecting a CV joint body and cup with a bolt array; and
   interposing a gasket between the body and cup using a plurality of tabs defining semi-annular cutouts from a gasket inner radial diameter, the body and cup defining a notch array around a gasket outer perimeter corresponding to the bolt array and having an outer radial diameter, which is greater than a radius of a bolt centerline, the notch array including indentations adjacent a corresponding bolt defining an open space between the bolt centerline and indentations.

\* \* \* \* \*